United States Patent
Hori et al.

(10) Patent No.: US 6,332,137 B1
(45) Date of Patent: Dec. 18, 2001

(54) PARALLEL ASSOCIATIVE LEARNING MEMORY FOR A STANDALONE HARDWIRED RECOGNITION SYSTEM

(76) Inventors: Toshikazu Hori, 10134 Parkwood Drove, Cupertino, CA (US) 95014; Guy Paillet, 119 Mariner Green, Corte Madera, CA (US) 94925; Jeffrey M. Woo, 896 Kearny Ter., Sunnyvale, CA (US) 94086

(*) Notice: Subject to any disclaimer, the term of this patent is extended or adjusted under 35 U.S.C. 154(b) by 0 days.

(21) Appl. No.: 09/249,246

(22) Filed: Feb. 11, 1999

(51) Int. Cl.[7] .................................................. G06N 3/02
(52) U.S. Cl. .............................. 706/15; 706/14; 706/26; 706/27
(58) Field of Search .................... 706/14, 26, 27, 706/33, 41, 15

(56) References Cited

U.S. PATENT DOCUMENTS

| | | | |
|---|---|---|---|
| 5,621,863 | * 4/1997 | Boulet et al. | 706/26 |
| 5,649,070 | * 7/1997 | Connell et al. | 706/14 |
| 5,701,397 | * 12/1997 | Steimle et al. | 706/41 |
| 5,710,869 | * 1/1998 | Godefroy et al. | 706/41 |
| 5,717,832 | * 2/1998 | Steimle et al. | 706/33 |
| 5,740,326 | * 4/1998 | Boulet et al. | 706/27 |

OTHER PUBLICATIONS

Duranton, M., Image processing by neural networks, IEEE Micro, vol.: 16 Issue: 5, Oct. 1996, pp.: 12–19.*

Age Eide, et al., "Eye Identification for Face Recognition with Neural Networks", SPIE Conference, Orlando, FL, Apr. 1966.

Age Eide, et al., "The IBM ZISC036 Zero Instruction Set Computer", Ostfold College, Halden, Norway, 1996.

Ghislain de Tremiolles, et al., "Visual Probe Mark Inspection, Using Hardware Implementation Of Artificial Neural Networks, in VLSI Production", IWANN, Lanzarote, Canary Islands, Spain, Jun. 1997.

* cited by examiner

*Primary Examiner*—Mark R. Powell
*Assistant Examiner*—Wilbert L. Starks, Jr.
(74) *Attorney, Agent, or Firm*—Thomas E. Schatzel; Law Offices of Thomas E. Schatzel

(57) ABSTRACT

A recognition system comprises at least two field-programmable logic array devices connected to a common vector-input port of an array of a zero-instruction-set computers. Each field-programmable logic array device is configured to preprocess data from different respective media inputs and provide feature extraction vectors to the common vector-input port. Neural networks within the zero-instruction-set computer recognize the input patterns by comparing in parallel their vectors with those stored in each neural network cell. A variety of recognition jobs are made possible by changing the programming on-the-fly of the field-programmable logic array devices to suit each new job.

11 Claims, 3 Drawing Sheets

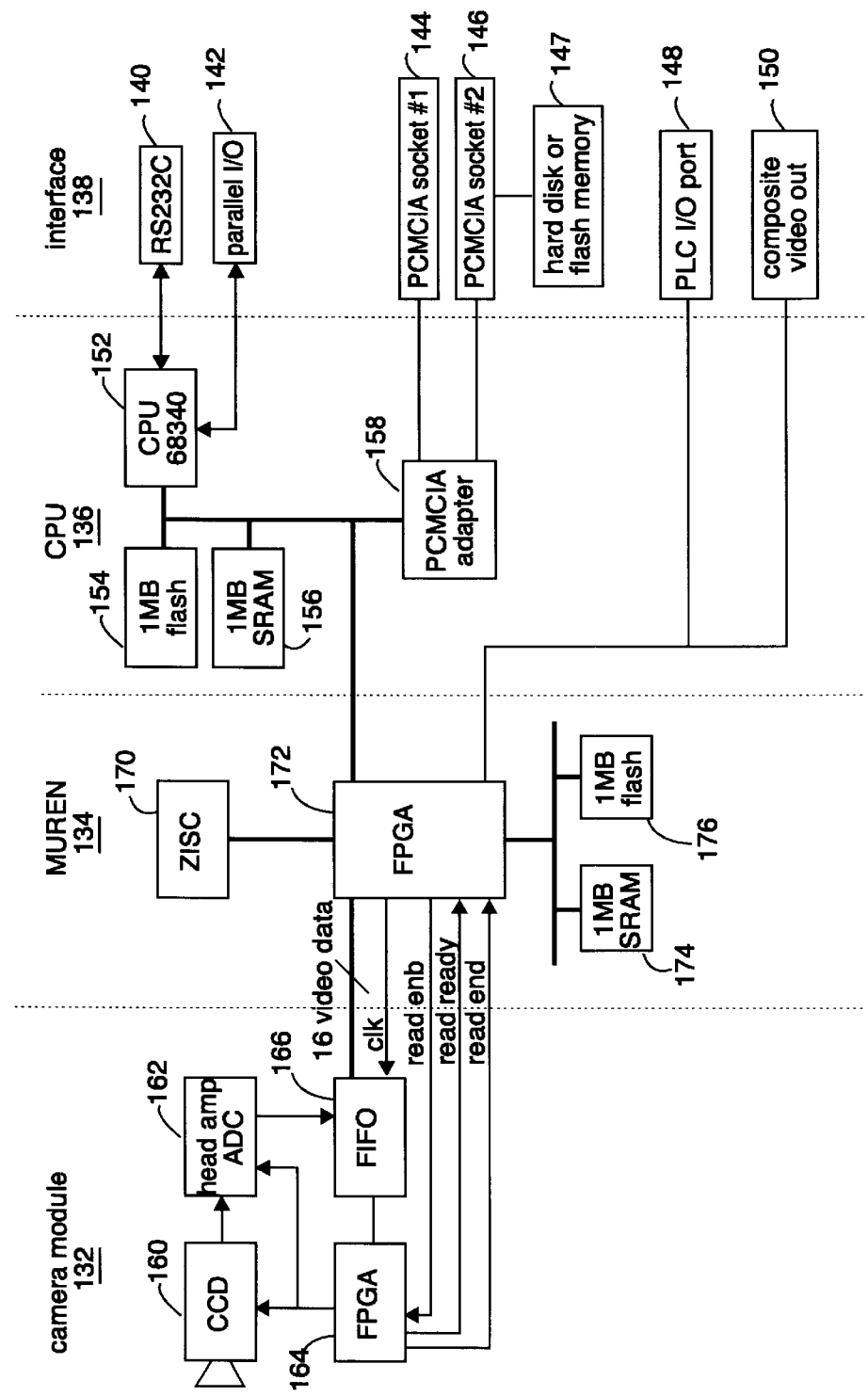

Figure 1:
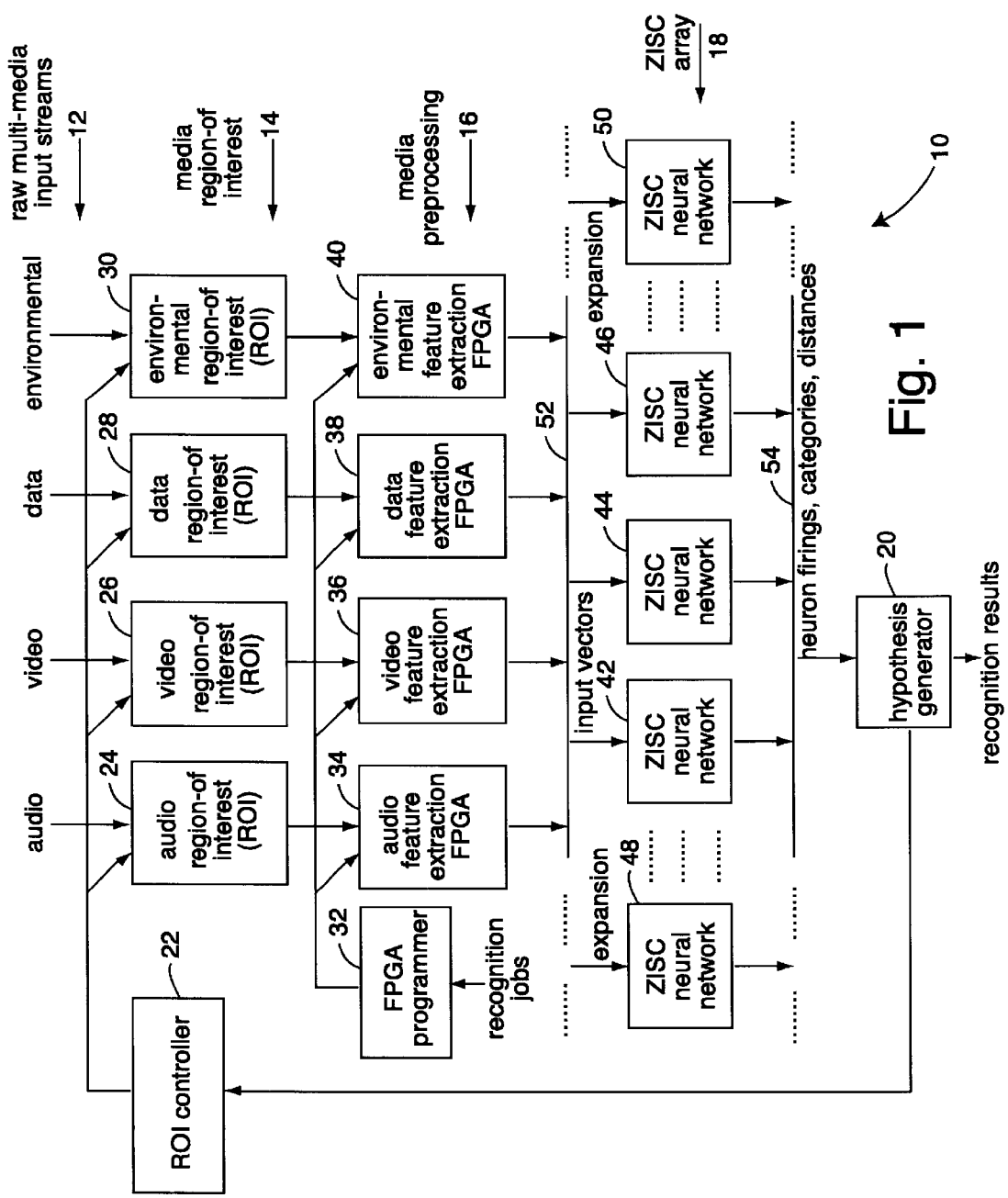

PARALLEL ASSOCIATIVE LEARNING MEMORY FOR A STANDALONE HARDWIRED RECOGNITION SYSTEM

FIELD OF THE INVENTION

The present invention relates to computer and artificial intelligence recognition systems, and more particularly to combinations of field programmable logic devices and zero instruction set computers that allow recognition jobs and lesson libraries to be changed on-the-fly.

DESCRIPTION OF THE PRIOR ART

A zero instruction set computer (ZISC) chip based on neural networks was developed by IBM in Paris and the present inventor, Guy Paillet. The first generation ZISC chip has thirty-six independent neurons or parallel processors. Each cell includes sixty-four bytes storage, a distance evaluator and a category register. Vectors that enter the chip are broadcast to all the cells for evaluation of the distance, or similarity, between the incoming vector and stored vectors. If the input and stored vectors match, or are similar, the category or attribute register will output to the response bus. Each of these cells is designed to compare an input vector of up to sixty-four bytes with a similar vector stored in the cell's memory. If the input vector matches the vector in the memory near enough, the neuron cell "fires" its output. Otherwise, it doesn't. All thirty-six cells in a ZISC chip compare their memory to the input vector at the same time. The cells that had a match are identified at the output. The ZISC will learn new vectors and adapt to the collection of reference vectors by submitting the training vector along with the desired output. No programming is required to teach the network. Save and restore operations allow transfer to and from the host computer.

In prior art recognition systems, a serial approach is universally used for pattern matching, e.g., a computer program loads a pattern into a memory, then fetches stored patterns from a large array, and then compares them one at a time looking for matches. More patterns to check means more time is needed to do the checking. Very fast computers can check lots of patterns in a short time, but eventually, a limit is reached in how many patterns can be realistically processed. A ZISC network, such as one comprised of ZISC036 devices, matches all the patterns in memory with the input at one time. The number of patterns in memory can be expanded by adding more such devices, and without suffering a decrease in recognition speed. Conventional ZISC chips have been used to offload the recognition function from general-purpose computers in various applications.

Age Eide, et al., describe the problem of facial recognition using the IBM ZISC036 chip in, "Eye Identification for Face Recognition with Neural Networks", presented at the SPIE Conference at Orlando, Fla., April 1966. A preprocessor for doing wavelet transforms upstream of the IBM ZISC036 RBF-chip is used to increase processing speed. Another implementation discussed is a two-stage neural network implemented in software. The first stage was used to recognize the common properties, and the second stage was used to recognize the differences.

The prior art in recognition systems has tended to focus on one media, such as video or audio. And if any preprocessors were used to improve the performance of the neural networks, such were fixed or inflexible in order to get portability. When size and expense were no object, then too much reliance on software has been placed and resulted in expensive and non-portable appliances.

SUMMARY OF THE INVENTION

It is therefore an object of the present invention to provide a recognition system that preprocesses several different media inputs for application as a single vector to an easily expandable array of neural networks.

It is a further object of the present invention to provide a recognition system that enables the field reprogrammability of its media preprocessors.

Briefly, a recognition system embodiment of the present invention comprises at least two field-programmable logic array devices connected to a common vector-input port of an array of a zero-instruction-set computer. Each field-programmable logic array device is configured to preprocess data from different respective media. Neural networks within the zero-instruction-set computer recognize the input patterns by comparing in parallel their vectors with those stored in each neural network cell. A variety of recognition jobs are made possible by changing the programming on-the-fly of the field-programmable logic array devices to suit each new job.

An advantage of the present invention is that a recognition system is provided that can be adapted on-the-fly to handle different recognition jobs.

Another advantage of the present invention is that a recognition system is provided that is easy to expand and that can simultaneously depend on several input media to quickly find pattern matches.

Another advantage of the present invention is that a recognition system is provided in a camera system that can process realtime images without software delay and slow down.

These and other objects and advantages of the present invention will no doubt become obvious to those of ordinary skill in the art after having read the following detailed description of the preferred embodiments which are illustrated in the various drawing figures.

IN THE DRAWINGS

Figure 2:
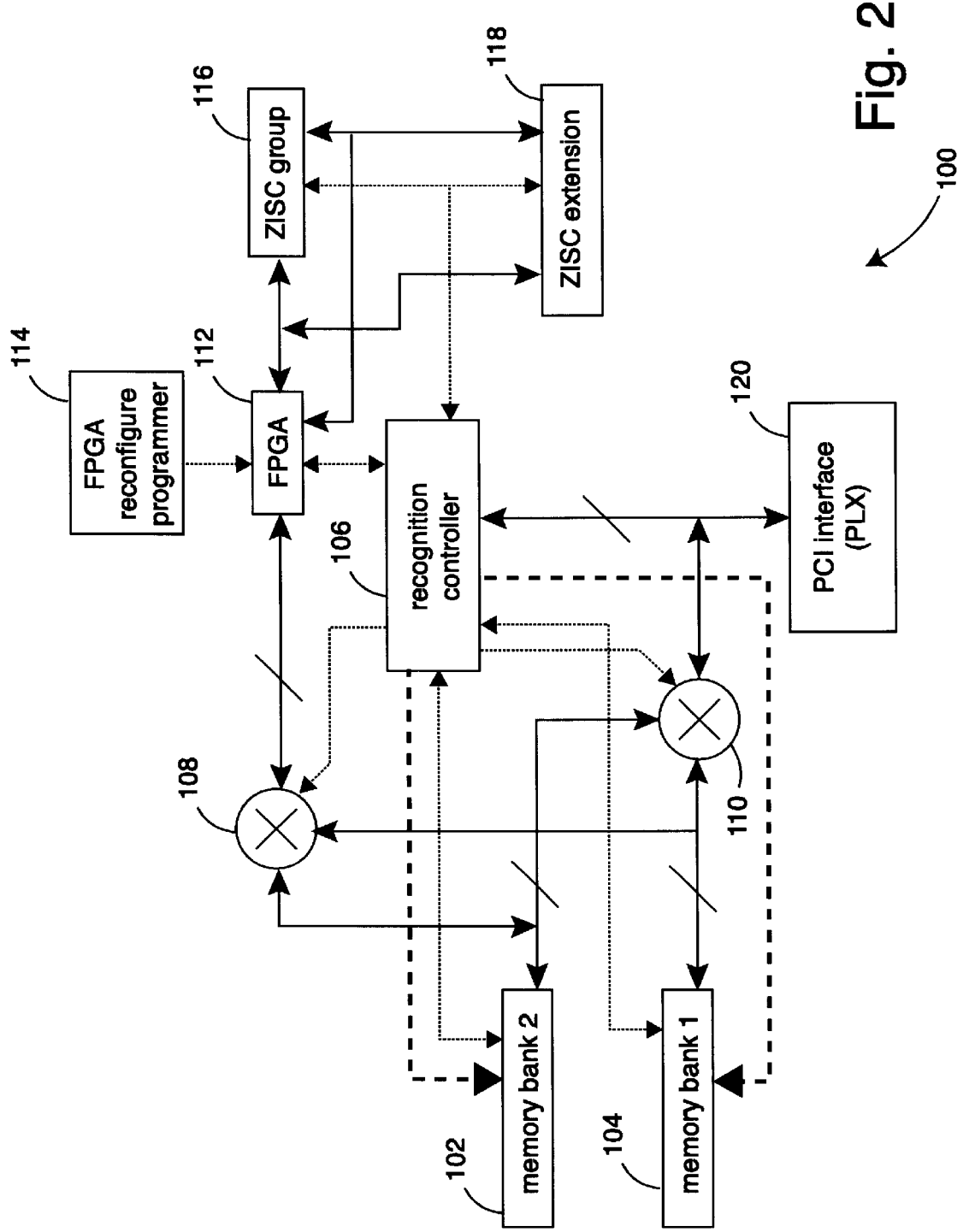

FIG. 1 is a functional block diagram of a packet-switching based telephony system embodiment of the present invention;

FIG. 2 is a functional block diagram of a recognition engine embodiment of the present invention implemented on a PCI-bus add-on computer board. In the diagram, solid lines represent data flow, dotted lines represent control, and dashed lines represent address buses; and FIG. 3 is a functional block diagram of a camera system embodiment of the present invention which is able to recognize objects of interest and then adjust the exposure control to present such object optimally.

DETAILED DESCRIPTION OF THE PREFERRED EMBODIMENT

A multimedia recognition system embodiment of the present invention is illustrated in FIG. 1 and is referred to herein by the general reference numeral 10. The recognition system 10 comprises a set of raw multi-media input ports 12, a corresponding set of media region-of-interest (ROI) selectors 14, a respective set of media preprocessors 16 implemented in field programmable gate array (FPGA) devices, and an expandable array 18 of zero instruction set computer (ZISC) neural networks.

The present inventor, Guy Paillet, has described such ZISC devices in U.S. Pat. No. 5,717,832, issued Feb. 10, 1998, with co-inventors Andre Steimle and Pascal Tannhof. Such United States Patent is incorporated herein in full by reference.

FIG. 1 suggests four types of media: audio, video, data, and environmental, but these are merely examples of the kinds of media that may be simultaneously input for various recognition jobs. For example, a recognition job that was directed at finding and tracking an F-14 fighter jet in flight could be aided by visual pictures of a suspected aircraft, the sounds it makes, the data it transmits, the speed it travels, the altitude it flies at, etc. Each media can constrain the list of possible identifications. The correct identification can thereby be more quickly arrived at by eliminating the impossible or improbable, e.g., an F-14 flying at less than fifty miles per hour or making the sound of a steam train. The multimedia inputs are also used to resolve the unknown item's identity to a higher degree, e.g., as is needed when an F-14 fighter jet in flight has been recognized and it must be determined if the F-14 belongs to the United States or another country. Identification friend-or-foe data inputs to ports 12 as data could be useful in such a recognition job.

A hypothesis generator 20 generates lists of possible items that may be evident in the various media inputs 12. For example, one video picture may comprise a far away airplane, a nearby bird, a cloud, and a wingman's plane flying alongside. All these items would appear on a list from the hypothesis generator 20 with their respective positions in each of the media. The hypothesis generator 20 may also be used to control the zero and scale of the media inputs 12, e.g., volume control for audio and exposure control for video. Preferably, the hypothesis generator 20 also constrains each recognition result by cross-correlating preliminary pattern recognitions with one another and eliminating conflicts before outputting a list of recognized items to a user. Such constraints can also be fixed constraints that are built into the system, e.g., birds will not be too quickly "recognized" as such if the point of observation is above 10,000 feet elevation.

A region-of-interest (ROI) controller 22 is used to parse, or otherwise select, portions of each raw multi-media input stream 12 for more intense scrutiny and processing. This ROI selection is equivalent to the way the eye uses its fovea centralis to "look" at a particular object. (The fovea centralis is the pit in the retina at the back of the eye where the vision is sharpest.) The eye has a wide field of view, e.g., peripheral vision, but to look at an object and recognize what is seen requires the image of the object-of-interest to be focused on the fovea centralis, as in reading printed words. The ROI selection is also equivalent to an electronic pan and zoom in a video image. For sound, the ROI may be a range of certain sound intensities, tones, voices, music, white noise, etc. For data, the ROI may be a particular radio signal, data type, code, etc. For environmental inputs, the ROI may be a range of certain accelerations, speeds, temperatures, light conditions, humidity, barometric pressure, global position, azimuth and elevation, etc.

The multimedia input streams 12 will generally be used to feed memory arrays that are, for example, organized in a two-dimensional array for video pictures. Each picture is comprised of pixels that each have an x-position, a y-position, color, and intensity. For sound, the intensity and frequency can be stored in memory according to time. Data can simply be placed in files. Environmental measurements can be stored in registers or memory arrays. A set of ROI memory arrays 24, 26, 28, and 30 are used in FIG. 1 to represent audio, video, data, and environmental data storage. The ROI controller 22 selects a portion of some or all of the stored information in the ROI memory arrays 24, 26, 28, and 30, and the selected portions move on to the media preprocessing 16.

A field programmable gate array (FPGA) programmer 32 is connected to reprogram, on-the-fly, a set of FPGA's 34, 36, 38, and 40, according to a current recognition job. The multimedia inputs that have been cropped down to their respective ROIs are then preprocessed by specialized processors adapted to each media type. The next recognition job may require a different mix of media, and so the FPGA programmer 32 allows the recognition job to be changed without having to make any real changes to the hardware or wiring.

The preprocessing comprises feature extraction. Each ROI will have a variety of information contained within, but only some features are important to the job of recognition. Data and other information that are not important or of little importance can be stripped out to reduce the number of input vectors that need to be passed on to the ZISC array 18. Sometimes the information needs to be converted or transformed to be more useful, as in fast Fourier transforms (FFTs). For example, the video feature extraction FPGA 36 can be reconfigured by the FPGA programmer 32 to be a wavelet transform processor (WTP), a color histogram processor, or a shape analysis processor. The audio feature extraction FPGA 34 can be reconfigured by the FPGA programmer 32 to be a codec, a dual-tone multi-frequency (DTMF) decoder, or a bandpass filter. The FPGAs can be implemented with devices sold by Xilinx, Inc., (San Jose, Calif.), such as the XC4000 E and XC4000 X series. These devices allow the FPGA devices to be dynamically reconfigured to change logic function while resident in the system.

The basic ZISC array 18 is represented by an exemplary set of three ZISC neural networks 42, 44, and 46. These are preferably implemented with IBM-type ZISC036 devices because the basic ZISC array 18 can be readily and easily expanded by additional ZISC neural networks 48 and 50. The design of the IBM-type ZISC036 devices allows a parallel expansion to an exceedingly wide array. All such devices in the array receive the same input vectors from the media preprocessors 16. The experience and learning of several hundred neural networks can thus be brought to bear on a current recognition job with the same throughput speed as that of a single IBM-type ZISC036 device.

Each ZISC036 device includes a plurality of radial basic function (RBF) neural networks with a three layer structure for recognizing patterns within the extracted-feature vectors. The three layer structure includes the common input neuron layer as its first layer which is represented by a bus 52 in FIG. 1. A second hidden layer formed of neuron circuits and is represented by the line of massively parallel ZISC neural networks 42–50. A neuron output layer functions as the output of the neuron circuits and is represented by a bus 54. The RBF-neural networks operate to recognize any input patterns in the extracted-feature vectors by comparing in parallel such vectors with a plurality of vectors stored in each neural network cell. The recognition results are all output to the single bus 54 that communicates the ZISC devices' neuron firings, categories, and distances to the hypothesis generator 20.

The job of recognition can be carried on alongside a main processor in a coprocessor fashion. The IBM-type ZISC chips use very little power and can be put into very portable environments. For example, Silicon Recognition (Sunnyvale, Calif.) markets an eighty-four-pin single inline module (SIM) that includes three to six ZISC chips with up to 216 processors. In a real world example of an agricultural application, a computerized system was developed to spray weeds and not anything else. Spraying other than the weeds was a waste of expensive herbicides. The weeds are also often intermixed with cash crops and can hide there. A system was developed that places a camera on a moving platform to scan twelve rows of crops at a time. Twelve herbicide spray nozzles were also attached, one for each row. Moving at approximately two miles per hour, the camera captured data for the ZISC chips to recognize whether the spray heads were positioned over plain ground, cash crops, or just weeds. If it was over any weeds, the respective spray head was activated by a control signal derived from the ZISC chips output. A full size computer wouldn't have been practical in this environment, due to the expense and the generally poor ability of computers to process recognition data caused by serial pattern matching.

FIG. 2 represents a recognition engine 100 implemented on a PCI-bus add-on computer board. The PCI-bus format allows embodiments of the present invention to be sold on the mass market and used in popular IBM-compatible and Apple Macintosh PowerPC personal computers. Raw multimedia inputs are steered by other pieces of the computer system to deposit their information in a pair of memory banks 102 and 104. The configuration of the two memory banks 102 and 104 allows one bank to be written while the other is being read. In this example, the input peripherals used to obtain the information streams or blocks are relatively unimportant.

Common JPG, GIF, TIFF, etc., type picture files or WAV-type sound files, for example, can be stored in the memory banks 102 and 104, according to the kind of information included in each such file. Even electrocardiograms (EKG's) and seismic data can be subjected to pattern recognition by embodiments of the present invention. A recognition controller 106 functions to select various regions of interest in the memory banks 102 and 104, and uses a pair of data selectors 108 and 110 to transfer the desired data parses to a field programmable gate array (FPGA) 112. Such FPGA is as is described for the media preprocessor 16 in FIG. 1. A FPGA programmer 114 is used to dynamically reconfigure the FPGA 112 to do various preprocessing jobs according to the kind of data loaded in the memory banks 102 and 104 and the items to be recognized in the regions of interest. A basic ZISC device group 116 receives feature extraction data from the FPGA 112 and may be infinitely expanded by additional ZISC extensions 118. A PCI interface chip 120 allows the board 100 to be accessed by the main computer system and various input-output peripheral controllers.

A smart camera embodiment of the present invention is diagrammed in FIG. 3 and is referred to herein by the general reference numeral 130. The camera 130 can recognize various objects of interest in its field of vision and automatically adjust the exposure, focus, pan, and zoom to optimize a region of interest that includes the object. A camera module 132 provides eight-bit or sixteen-bit digital video data to a multi-media recognition engine (MUREN) 134. A general purpose microcomputer (CPU) 136 provides region of interest control to the camera module 132 and MUREN 134. The MUREN 134 is similar in many ways to the construction and operation of the recognition system 10 of FIG. 1. An interface 138 includes a standard serial RS-232 C port 140, a parallel I/O 142, and a pair of industry standard PCMCIA sockets 144 and 146. Hard-disk, ETHERNET, VGA monitor, etc., functions can be adapted through the use of the PCMCIA sockets 144 and 146. For example, a memory 147 can be plugged in and can include a hard disk or flash memory card. A programmable logic controller (PLC) I/O port 148 and composite video output 150 are provided by the MUREN 134.

In general, an image sensor can be connected to provide a video image to the dynamically reconfigurable logic device for realtime image capture and recognition processing without the use of program software instruction execution. The removable memory storage device, e.g., memory 147, can help with the storage of image files obtained by the image sensor. Stored image files in memory 147 can also provide for system learning, verification, and on-site testing.

The CPU 136 can include a Motorola type-68340 microprocessor 152, a flash memory 154, a static random access memory (SRAM) 156 and a PCMCIA adapter 158 in a common configuration. The camera module 132 includes a charge-coupled device (CCD) 160 that drives a pre-amp and analog-to-digital converter (ADC) 162, an FPGA 164, and a first-in first-out (FIFO) register 166. A ZISC bank 170 is similar to the ZISC array 18 in FIG. 1. Similarly, an FPGA 172 performs the functions of the media preprocessors 16 of FIG. 1 and controls the results output of the ZISC 170 to the CPU 136. The function of hypothesis generator 20 of FIG. 1 is included in the CPU 136 of FIG. 3. A static random access memory (SRAM) 174 and a flash memory 176 are used to support the FPGA 172.

In general, recognition system embodiments of the present invention comprise at least two field-programmable logic array devices each separately configurable as a preprocessor for recognition feature extraction. These are directly connected to output a series of extracted-feature vectors to a common input neuron layer. A plurality of massively parallel zero-instruction-set computer devices are each connected to receive the extracted-feature vectors from the common first neuron layer bus. Such zero-instruction set computer devices are described in European Patent Application EP-0-694-854-A1, published 31.01.1996 (Jan. 31, 1996), and also in U.S. Pat. No. 5,717,832, issued Feb. 10, 1998.

Each zero-instruction-set computer device includes a plurality of radial basic function (RBF) neural networks with a three layer structure for recognizing patterns within the extracted-feature vectors. The three layer structure includes the common input neuron layer as its first layer, a second hidden layer formed of neuron circuits, and a neuron output layer that functions as the output of the neuron circuits. The RBF-neural networks operate to recognize any input patterns in the extracted-feature vectors by comparing in parallel such vectors with a plurality of vectors stored in each neural network cell. A dynamic reprogrammer is preferably connected to the field-programmable logic array devices that provides for a variety of recognition jobs to be made possible by changing any programming on-the-fly of the field-programmable logic array devices to suit each new job.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A recognition system, comprising:

a dynamically reconfigurable logic device similar to a field programmable gate array and programmed to do a feature extraction process from a media input stream; and a zero instruction set computer (ZISC) device that includes a plurality of neural networks that are connected to simultaneously receive a preprocessed feature extraction data from the dynamically reconfigurable logic device;

wherein, a variety of recognition jobs can each be processed by the combination of the logic device and the ZISC by changing said feature extraction process via a dynamic reconfiguration and substantially no hardware changes.

2. The system of claim 1, further including:

a plurality of dynamically reconfigurable logic devices each respectively programmed to do a unique feature extraction process from a corresponding and separate media input stream, and to output all extracted features onto a common bus; and a plurality of zero instruction set computer (ZISC) devices each with a vector input connected to said common bus to simultaneously match all extracted features;

wherein the plurality of zero instruction set computer (ZISC) devices is expandable into a massively parallel configuration.

3. The system of claim 1, further including:

a memory in which said media input stream is stored; and a region-of-interest (ROI) controller providing for the selection of a portion of said media input stream to be transferred from the memory to any of the dynamically reconfigurable logic devices.

4. The system of claim 3, further including:

a hypothesis generator connected to receive recognition results from the plurality of ZISC devices and providing bounds information to the ROI controller for particular regions-of-interest stored in the memory.

5. The system of claim 4, wherein:

the hypothesis generator constrains each recognition result by cross-correlating preliminary pattern recognitions with one another and eliminating conflicts before outputting a list of recognized items to a user.

6. The recognition system of claim 1, further comprising:

an image sensor connected to provide a video image to the dynamically reconfigurable logic device wherein real-time image capture and recognition processing can proceed without executing a software program.

7. The recognition system of claim 6, further comprising:

a removable memory storage device providing for storage of image files obtained by the image sensor, wherein a plurality of stored image files provide for system learning, verification, and on-site testing.

8. A recognition system, comprising:

at least two field-programmable logic array devices each separately configurable as a preprocessor for recognition feature extraction and connected to output a series of extracted-feature vectors to a common input neuron layer; and a plurality of massively parallel zero-instruction-set computer devices each connected to receive said extracted-feature vectors from said common first neuron layer bus and each including a plurality of radial basic function (RBF) neural networks with a three layer structure for recognizing patterns within said extracted-feature vectors;

wherein, said three layer structure includes said common input neuron layer as its first layer, a second hidden layer formed of neuron circuits, and a neuron output layer that functions as the output of said neuron circuits.

9. The recognition system of claim 8, wherein:

said RBF-neural networks operate to recognize any input patterns in said extracted-feature vectors by comparing in parallel such vectors with a plurality of vectors stored in each neural network cell.

10. The recognition system of claim 9, further comprising:

a dynamic reprogrammer connected to the field-programmable logic array devices that provides for a variety of recognition jobs to be made possible by changing any programming on-the-fly of the field-programmable logic array devices to suit each new job.

11. A recognition system, comprising:

a dynamically reconfigurable logic device similar to a field programmable gate array and programmed to do a feature extraction process from a media input stream; and a zero instruction set computer (ZISC) device that includes a plurality of neural networks that are connected to simultaneously receive a preprocessed feature extraction data from the dynamically reconfigurable logic device;

wherein, a variety of recognition jobs can each be processed by the combination of the logic device and the ZISC by changing said feature extraction process via a dynamic reconfiguration and substantially no hardware changes and no computer instruction.

* * * * *